United States Patent [19]
Lacey

[11] Patent Number: 5,696,653
[45] Date of Patent: Dec. 9, 1997

[54] TOOLING FOR HOLDING A HEAD GIMBAL ASSEMBLY

[75] Inventor: Christopher A. Lacey, San Diego, Calif.

[73] Assignee: Phase Metrics, San Diego, Calif.

[21] Appl. No.: 766,898

[22] Filed: Dec. 13, 1996

[51] Int. Cl.[6] .............. G11B 5/55; G11B 21/08; G01J 1/02
[52] U.S. Cl. ............... 360/104; 356/243; 360/106
[58] Field of Search ................... 356/243, 445, 356/446, 3, 4.01; 360/104–107, 87.01, 97.03, 98.02, 98.07, 102, 103, 98.06, 77.11, 137; 248/664–669, 638, 131, 55–57, 155.2, 397, 371

[56] References Cited

U.S. PATENT DOCUMENTS

| | | | |
|---|---|---|---|
| 4,980,783 | 12/1990 | Moir et al. | 360/77.02 |
| 5,027,239 | 6/1991 | Hagen | 360/104 |
| 5,285,948 | 2/1994 | Rupp et al. | 228/104 |
| 5,339,702 | 8/1994 | Viches | 73/865.9 |
| 5,471,734 | 12/1995 | Hatch et al. | 29/603 |
| 5,526,204 | 6/1996 | French et al. | 360/97.02 |
| 5,579,190 | 11/1996 | Mastache et al. | 360/106 |
| 5,638,207 | 6/1997 | Fukuzawa et al. | 359/375 |

*Primary Examiner*—Frank G. Font
*Assistant Examiner*—Michael P. Stafira
*Attorney, Agent, or Firm*—Blakely Sokoloff Taylor & Zafman

[57] ABSTRACT

A tooling fixture that holds a head gimbal assembly (HGA) of a hard disk drive within a piece of test equipment. The tooling fixture includes a plurality of pads that extend from a top surface of a chimney. The HGA has a slider that is mounted to a flexure arm. The flexure arm extends from a base plate of the HGA. The base plate has a swage mount that is inserted into a corresponding aperture of the chimney when an operator loads an HGA into the tester. The pads of the chimney support the base plate and the HGA. The base plate is typically clamped onto the chimney by a spring biased clamp. The HGA is moved adjacent to a rotating disk of the tester. The pads provide a reliable contact surface that improves the repeatability of the HGA positioning which in turn can improve the tester.

9 Claims, 3 Drawing Sheets

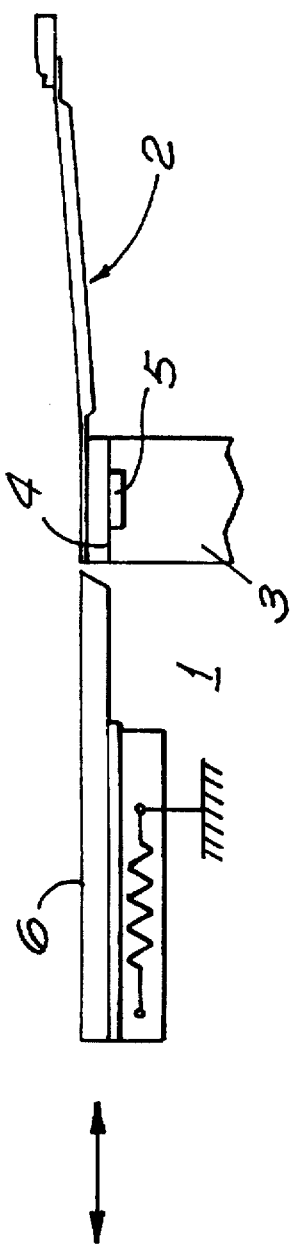
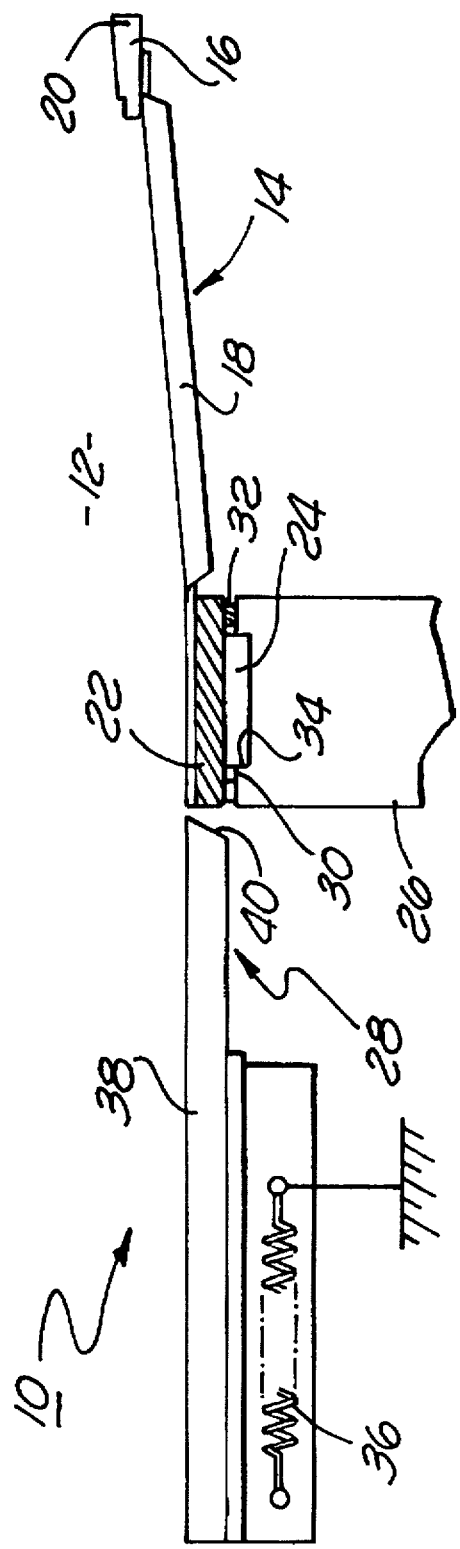
FIG. 1 (PRIOR ART)
FIG. 2

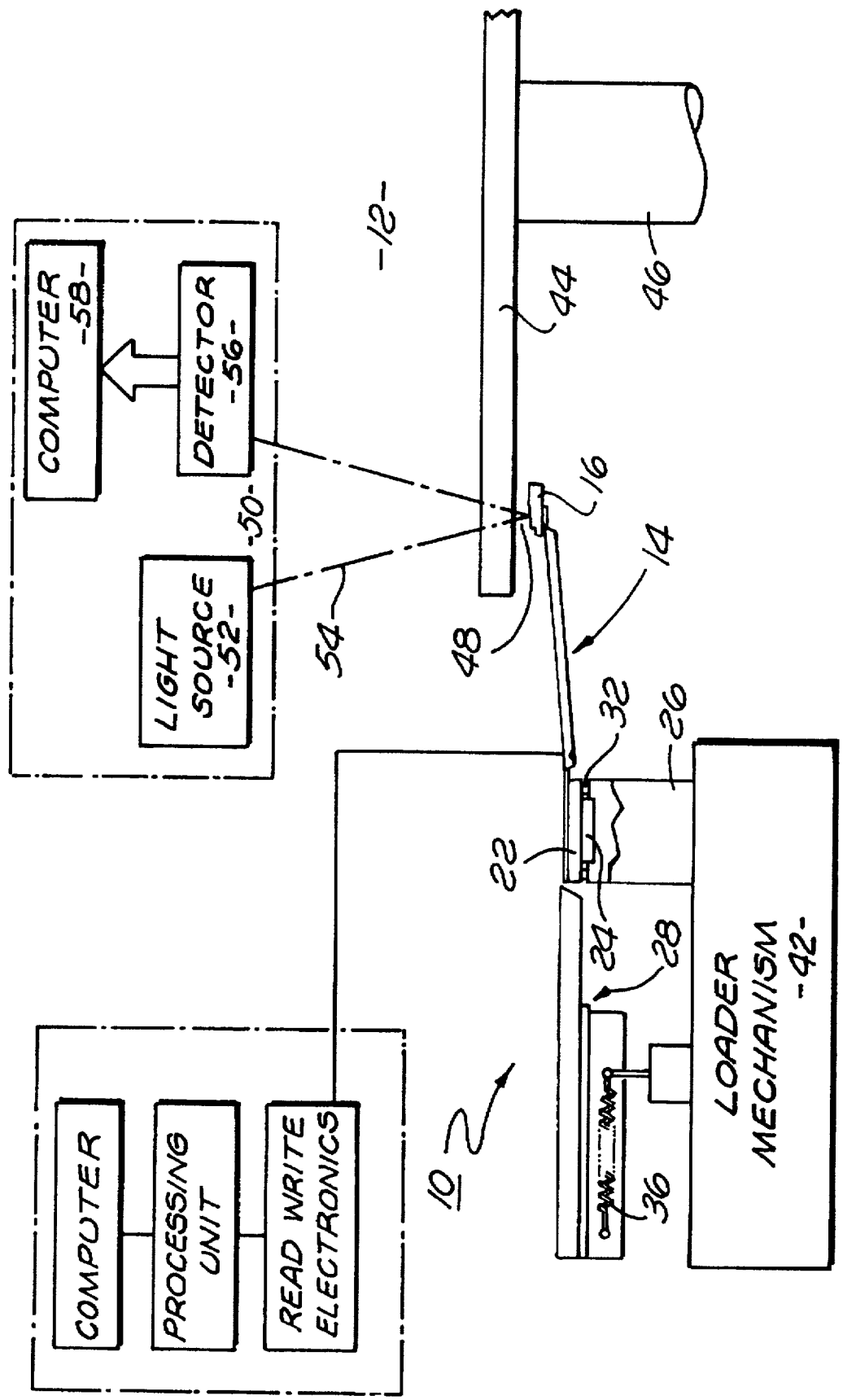

TOOLING FOR HOLDING A HEAD GIMBAL ASSEMBLY

BACKGROUND OF THE INVENTION

1. Field of the Invention

The present invention relates to a tooling fixture that holds a head gimbal assembly of a hard disk drive within a piece of test equipment.

2. Description of Related Art

Hard disk drives contain recording heads that magnetize and sense the magnetic field of a rotating disk(s). The recording heads are each integrated into a head gimbal assembly (HGA). When assembled into the hard disk drive, the HGA is typically permanently swagged onto an actuator arm.

Prior to final assembly in the disk drive, the HGA is typically tested on several pieces of equipment. One piece of test equipment is a dynamic electrical tester. In the dynamic electrical tester, the HGA is temporarily mounted and loaded against a rotating magnetic disk. Various magnetic writing and read operations are performed to determine the functionality of the HGA. Another piece of test equipment is the flying height tester. In a flying height tester, the HGA is temporarily mounted and loaded against a rotating transparent disk. The spacing between the slider on the HGA and the rotating disk is determined by measurement through the transparent disk. Other tests may also be performed that require fast load and unload of the HGA onto tooling in the test equipment.

FIG. 1 shows a tooling fixture 1 for holding an HGA 2 during the measurement. The fixture 1 includes a chimney 3 that supports a base plate 4 of the HGA 2. The chimney 3 has an aperture which receives a swage mount 5 of the base plate 4. The base plate 4 is clamped onto the chimney 3 by a spring biased blade 6.

Small variations in mounted position of the HGA in the test equipment tooling can be a cause of non-repeatability of the test equipment measurement. Variations in the clamping pressure may deform the laser welds which attach the flexure arm to the base plate. The deformation may move the location of the slider and effect the repeatable of the test results. It would be desirable to have a tooling fixture that provides more repeatable positioning of the HGA in test equipment tooling than fixtures of the prior art.

SUMMARY OF THE INVENTION

The present invention is a tooling fixture that holds a head gimbal assembly (HGA) of a hard disk drive within a piece of test equipment. The tooling fixture includes a plurality of pads that extend from a top surface of a chimney. The HGA has a slider that is mounted to a flexure arm. The flexure arm extends from a base plate of the HGA. The base plate has a swage mount that is inserted into a corresponding aperture of the chimney when an operator loads an HGA into the tester. The pads of the chimney support the base plate and the HGA. The base plate is typically clamped onto the chimney by a spring biased clamp. The HGA is moved adjacent to a rotating disk of the tester. The pads provide a reliable contact surface that improves the repeatability of the positioning of the HGA on the test equipment tooling which can improve the repeatability of the test equipment measurements.

BRIEF DESCRIPTION OF THE DRAWINGS

FIG. 1 is a side view of a tooling fixture of the prior art;

FIG. 2 is a side view of a flying height tester tooling fixture of the present invention;

FIG. 4 is a side view showing a head gimbal assembly mounted to the tooling fixture and moved adjacent to a rotating disk of a piece of test equipment;

DETAILED DESCRIPTION OF THE INVENTION

Figure 3:
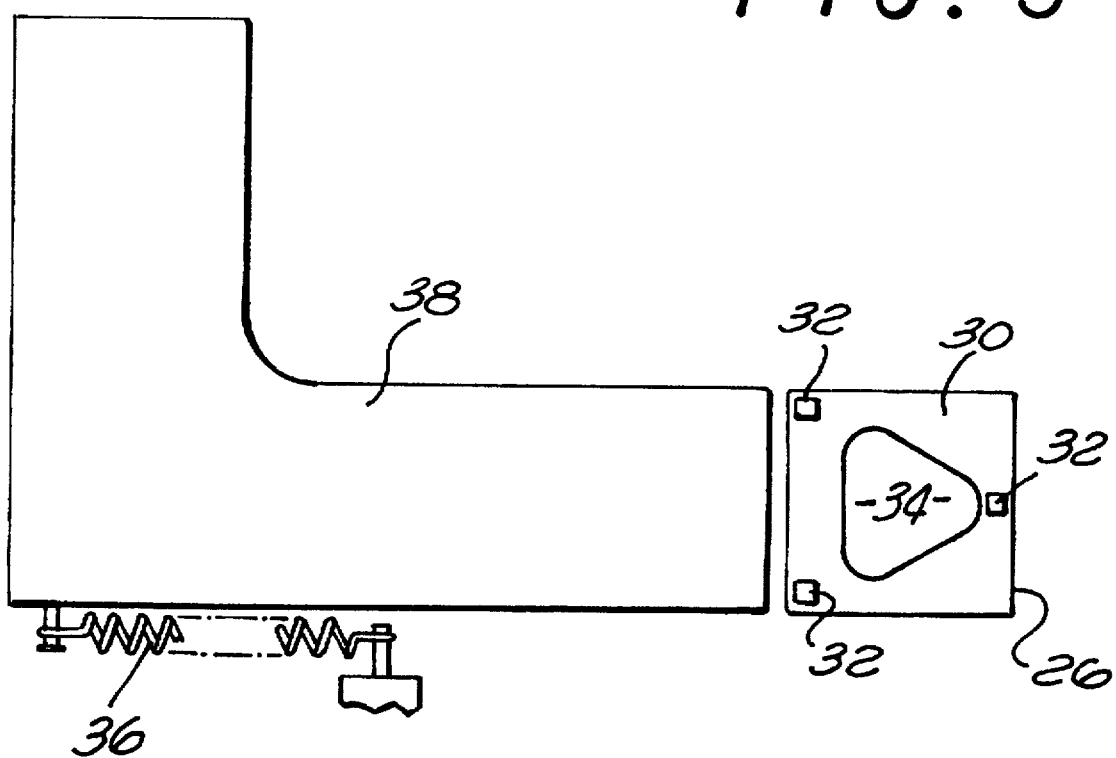
FIG. 3 is a top view of the tooling fixture without a head gimbal assembly.

Referring to the drawings more particularly by reference numbers, FIGS. 2–4 show a tooling fixture 10 of a flying height tester 12. Flying height testers 12 are used to measure the air bearing thickness of a head gimbal assembly 14 (HGA) that is installed into a hard disk drive (not shown). HGAs 14 typically include a slider 16 that is mounted to a flexure arm 18. The slider 16 contains a recording head 20 which can magnetize and sense the magnetic field of a magnetic disk. The HGA typically has wires or a flex circuit (not shown) that couple the recording head with the electronics of a hard disk drive assembly.

The flexure arm 18 extends from a base plate 22 of the HGA 14. Extending from the base plate 22 is a swage mount 24 that is used to attach the HGA 14 to an actuator arm of a hard disk drive. The HGA 14 is typically tested by the flying height tester 12 before being assembled into a disk drive unit.

The tooling fixture 10 includes a chimney 26 and a clamp assembly 28. Extending from the top surface 30 of the chimney 26 are a plurality of pads 32. In the preferred embodiment, the chimney 26 contains three pads 32 located in a triangular arrangement. The pads 32 may be machined from the chimney 26, or be provided as separate pieces that are mounted to the top surface 30 of the chimney 26. In the preferred embodiment, the pads 32 extend approximately 0.01 inches above the top surface 30. The pads 32 support the base plate 22 of the HGA 14. To reduce wear, the pads 32 may be constructed from a hard material such as a ceramic or a sapphire.

The chimney 26 also contains a center aperture 34 that receives the swage mount 24 of the base plate 22 when the HGA 14 is loaded onto the tester 12. The aperture 34 has a generally triangular shape to accurately align the HGA 14 within the tester 12.

The clamp assembly 28 includes a spring 36 that biases a blade 38 toward the chimney 26 to clamp the HGA 14. The blade 38 has a chamfered surface 40 that applies a force which has both normal and tangential components that press the base plate 22 onto the chimney 26. The blade 38 can be manipulated by an operator 12 of the flying height tester 12 to load and unload the HGA 14. Although a spring loaded blade is shown and described, it is to be understood that any type of clamping mechanism may be employed with the chimney 26 of the present invention.

As shown in FIG. 4, an HGA 14 is loaded into the flying height tester 12 by inserting the swage mount 24 into the aperture 34 of the chimney 26. The blade 38 is typically pulled in a direction away from the chimney 26 so that the base plate 22 can be placed onto the pads 32. The blade 38 is then released so that the clamp assembly 28 secures the HGA 14 to the chimney 26.

The tester 12 has a loader mechanism 42 that moves the HGA 14 adjacent to a transparent disk 44. The loader 42 may include a ball screw (not shown) that is driven by an electric motor (not shown). The transparent disk 44 is rotated by a spindle motor 46. The slider 16 is separated from the disk 42 by an air gap 48.

The tester may have an optical system 50 which measures the thickness of the air gap 48. The optical system 50 includes a light source 52 that directs a light beam 54 through the transparent disk 44 and onto the slider 16. The light beam 54 is reflected from the slider 16 onto a detector 56. The detector 56 is coupled to a computer 58 which can compute the thickness of the air gap 48 from the detected reflected light beam 54. After the measurement routine is completed the fixture 10 is moved back to the original position so that the operator can replace the HGA 14 with another part. The relatively small area of the chimney pads 32 provides a reliable contact surface for the tooling fixture 10.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Although a flying height tester is shown and described, it is to be understood that the fixture 10 may be used in a dynamic electrical tester, wherein the HGA is placed adjacent to a magnetic disk and electrical characteristics of the head 20 are then measured. The electrical tester has a read/write circuit for reading and writing a signal(s) on the disk and processing circuitry to measure the electrical characteristics.

Figure 5:
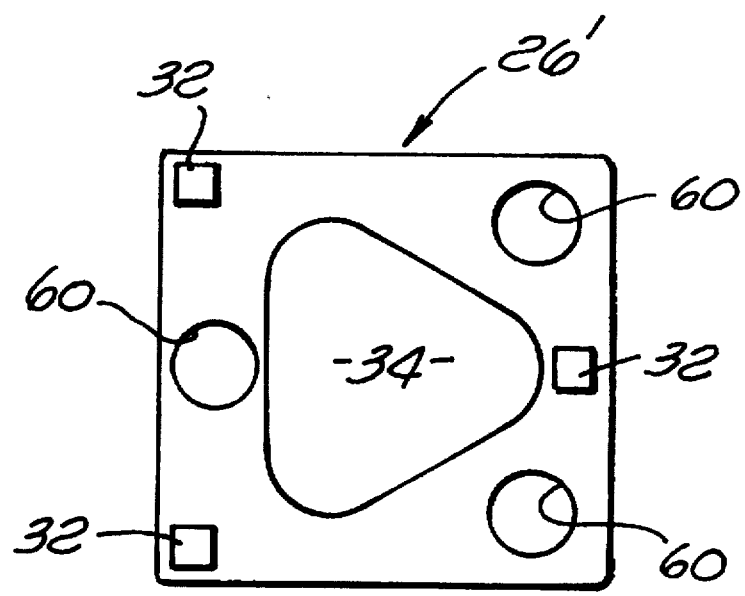
FIG. 5 is a top view of an alternate embodiment of the tooling fixture.

FIG. 5 shows an alternate embodiment of a chimney 26' which has a plurality of vacuum ports 60. The vacuum ports 60 are coupled to a source of vacuum (not shown), such as a vacuum line typically found at industrial facilities. The vacuum ports 58 create a negative pressure that pulls an HGA onto the pads 58. The pull of the negative pressure prevents movement of the HGA while the operator is clamping the HGA base plate 22 onto the chimney 26'.

What is claimed is:

1. A tooling fixture for a head gimbal assembly (HGA), wherein the HGA has a swage mount that extends from a base plate, comprising:

a chimney which has an aperture that receives the swage mount, and a plurality of pads that extend from a top surface of said chimney and support the base plate of the HGA.

2. The fixture as recited in claim 1, wherein said pads include three pads located in a triangular arrangement on said top surface of said chimney.

3. The fixture as recited in claim 1, wherein said chimney has an opening that creates a negative pressure between the HGA and said chimney.

4. The fixture as recited in claim 1, further comprising a clamp that clamps the HGA to said chimney.

5. A flying height tester for testing a head gimbal assembly (HGA) which has a slider that is mounted to a flexure arm, the flexure arm extends from a base plate that has a swage mount, comprising:

a disk;

a spindle motor that rotates said disk;

a chimney which has an aperture that receives the swage mount, and a plurality of pads that extend from a top surface of said chimney and support the base plate of the HGA so that the slider is separated from said disk by an air gap; and, an optical system that measures the air gap.

6. The tester as recited in claim 5, wherein said pads include three pads located in a triangular arrangement on said top surface of said chimney.

7. The tester as recited in claim 5, wherein said chimney has an opening that creates a negative pressure between the HGA and said chimney.

8. The tester as recited in claim 5, further comprising a clamp that clamps the HGA to said chimney.

9. A method for loading a head gimbal assembly (HGA) into a flying height tester, wherein the HGA has a slider that is mounted to a flexure arm, and the flexure arm extends from a base plate that has a swage mount, comprising the steps of:

a) providing a flying height tester that includes a disk that is rotated by a spindle motor, a chimney which has an aperture and a plurality of pads that extend from a top surface of said chimney, and an optical measuring system;

b) inserting the swage mount into said chimney aperture so that the base plate is supported by said pads;

c) moving said chimney so that the slider is separated from said disk by an air gap; and (d) measuring the air gap with said optical measuring system.

* * * * *